United States Patent
Ahn et al.

(10) Patent No.: US 9,207,382 B2
(45) Date of Patent: Dec. 8, 2015

(54) LIGHT UNIT HAVING LIGHT GUIDE MEMBER WITH RECEIVING HOLES WITH ROUND PART

(75) Inventors: Kyoung Soo Ahn, Seoul (KR); Jong Sun Kim, Seoul (KR); Sang Jun Park, Seoul (KR); Hyung Min Park, Seoul (KR); Jeong Oh Lee, Seoul (KR); Jae Hyuk Jang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 13/885,631

(22) PCT Filed: Nov. 10, 2011

(86) PCT No.: PCT/KR2011/008534
§ 371 (c)(1),
(2), (4) Date: May 15, 2013

(87) PCT Pub. No.: WO2012/067376
PCT Pub. Date: May 24, 2012

(65) Prior Publication Data
US 2013/0250617 A1    Sep. 26, 2013

(30) Foreign Application Priority Data
Nov. 15, 2010  (KR) .................. 10-2010-0113329

(51) Int. Cl.
*F21V 8/00* (2006.01)
*G02F 1/1335* (2006.01)

(52) U.S. Cl.
CPC ............ *G02B 6/0033* (2013.01); *G02B 6/0021* (2013.01); *G02B 6/0068* (2013.01);
(Continued)

(58) Field of Classification Search
CPC .. G02B 6/0021; G02B 6/0068; G02B 6/0073; G02B 6/0066; G02B 6/007; G02B 6/0071; G02F 1/133603
USPC ......................................................... 362/621
See application file for complete search history.

(56) References Cited

U.S. PATENT DOCUMENTS

| | | | |
|---|---|---|---|
| 2004/0130515 A1* | 7/2004 | Chuang et al. ................... | 345/82 |
| 2006/0203513 A1 | 9/2006 | Aoki | |

(Continued)

FOREIGN PATENT DOCUMENTS

| | | |
|---|---|---|
| CN | 1523420 A | 8/2004 |
| CN | 2896325 Y | 5/2007 |

(Continued)

OTHER PUBLICATIONS

Machine translation of Horie et al. JP 10-082915 A, retrieved Jun. 3, 2014.*

(Continued)

*Primary Examiner* — Anh Mai
*Assistant Examiner* — Steven Horikoshi
(74) *Attorney, Agent, or Firm* — Saliwanchik, Lloyd & Eisenschenk

(57) ABSTRACT

Disclosed is a light unit. The light unit includes a printed circuit board formed thereon with a plurality of LEDs and a light guide member having receiving holes to receive the LEDs. At least one round part having a predetermined curvature is formed at an edge defined in an intersection between an upper surface and an inner surface of the receiving hole. Since the round part is formed at the edge in the receiving hole receiving the LED at the portion of the light guide member, the light distribution is improved so that the light efficiency is increased.

10 Claims, 5 Drawing Sheets

(52) U.S. Cl.
CPC ............ *G02B6/0073* (2013.01); *G02B 6/0083* (2013.01); *G02F 1/133603* (2013.01); *G02F 1/133605* (2013.01)

(56) References Cited

U.S. PATENT DOCUMENTS

| | | | | |
|---|---|---|---|---|
| 2006/0209563 | A1* | 9/2006 | Hirota et al. | 362/608 |
| 2008/0002428 | A1 | 1/2008 | Byun et al. | |
| 2008/0304288 | A1* | 12/2008 | Iwasaki | 362/632 |
| 2010/0149802 | A1* | 6/2010 | Chang | 362/235 |

FOREIGN PATENT DOCUMENTS

| | | | | |
|---|---|---|---|---|
| JP | 10-082915 | A | | 3/1998 |
| JP | 10082915 | A * | 3/1998 | ............... G02B 6/00 |
| JP | 2000-267096 | A | | 9/2000 |
| JP | 2004-212830 | A | | 7/2004 |
| JP | 2006-251075 | A | | 9/2006 |
| JP | 2008-016429 | A | | 1/2008 |
| JP | 2008-257900 | A | | 10/2008 |
| JP | 2009-170205 | A | | 7/2009 |
| KR | 10-2007-0115129 | A | | 12/2007 |
| WO | WO-2005-052441 | A1 | | 6/2005 |

OTHER PUBLICATIONS

Polyhedron Vortex, retrieved online from Wolfram Mathworld on Oct. 30, 2014.*
International Search Report in International Application No. PCT/KR2011/008534, filed Nov. 10, 2011.
Office Action dated Mar. 4, 2014, in Japanese Application No. 2013-538644.
European Search Report dated Jul. 24, 2014 in European Application No. 11842386.2.
Office Action dated Dec. 31, 2014, in Chinese Application No. 201180055048.7.

* cited by examiner (a)

(b)

(a)

(b)

(a)　　　　　　　　　　　(b)

LIGHT UNIT HAVING LIGHT GUIDE MEMBER WITH RECEIVING HOLES WITH ROUND PART

CROSS-REFERENCE TO RELATED APPLICATIONS

This application is the U.S. national stage application of International Patent Application No. PCT/KR2011/008534, filed Nov. 10, 2011, which claims priority to Korean Application No. 10-2010-0113329, filed Nov. 15, 2010, the disclosures of each of which are incorporated herein by reference in their entirety.

TECHNICAL FIELD

The embodiment relates to a backlight unit capable of improving the light efficiency.

BACKGROUND ART

A liquid crystal display (LCD) is a display device to display desired images by adjusting transmittance of light passing through pixels by individually supplying data signals according to image information to the pixels aligned in the form of a matrix. Since the LCD is a non-emissive device, a backlight unit is installed at a rear of the LCD to display the images.

The backlight unit has a function of uniformly supplying light to a rear surface of the non-emissive LCD to display the images and includes a light guide member having a function of uniformly distributing the brightness and the light of the backlight unit. The light guide member is one of plastic lenses for uniformly transferring the light emitted from a light emitting diode (LED) to the LCD.

FIG. 1 is a sectional view showing the structure of a backlight unit employing the LED as a light source. As shown in FIG. 1, the backlight unit includes a plurality of LEDs 20 installed on a printed circuit board 10 and a light guide member 30 for transferring the light emitted from the LEDs 20 in the upward direction. In particular, recently, there are many attempts to uniformly emit the light through the entire light emitting surface by using a plurality of LEDs. In this case, the LEDs are aligned on a plane and concave holes are formed in the guide member such that the LEDs can be inserted into the concave holes.

However, if the LEDs are inserted into the concave holes, a hot spot may occur at the surface adjacent to the LEDs due to the heat, so the brightness may become relatively high at the surface adjacent to the LEDs, resulting in the brightness blot. In addition, as shown in FIG. 1, if edges E having a predetermined angle are formed at the concave holes receiving the LEDs, the light emitted to the edges may be reflected or irregularly travelled, so that the light characteristics may be degraded.

DISCLOSURE OF INVENTION

Technical Problem

The embodiment provides a light unit including a light guide member, in which edges provided at receiving holes, which are formed at a lower portion of the light guide member to receive LEDs, are curved to improve the light distribution, so that the light efficiency can be enhanced.

Solution to Problem

A backlight unit according to the embodiment includes a printed circuit board formed thereon with a plurality of LEDs; and a light guide member having receiving holes to receive the LEDs, wherein at least one round part having a predetermined curvature is formed at an edge defined in an intersection between an upper surface and an inner surface of the receiving hole.

The receiving hole includes the upper surface, a lower surface having an open structure, and the inner surface, which are defined in the light guide member, and the upper surface has a width equal to or smaller than a width of the lower surface. Thus, the receiving hole has a rectangular parallelepiped shape having an open lower surface and the round part has a radius of curvature equal to or less than a ½ length of a short lateral side of the upper surface of the receiving hole.

In addition, the receiving hole has at least one round part formed at an edge defined in an intersection between the lower surface and the inner surface of the receiving hole.

Further, the inner surface of the receiving hole or an extension line of the lower surface of the receiving hole forms an angle in the range of $0 \leq \theta \leq 90°$ with respect to an extension line of a lower surface of the light guide member.

In addition, a gap between the receiving hole and the LED is set in a size equal to or less than 100 mm.

According to the embodiment, the receiving hole may have a hemispherical structure by forming the round part such that the round part has the radius of curvature equal to or greater than a ½ length of the short lateral side of the upper surface of the receiving hole or equal to or less than a ½ length of a diagonal line of a sectional shape of the LED.

Advantageous Effects of Invention

According to the embodiment, the edges provided at receiving holes, which are formed at the lower portion of the light guide member to receive the LEDs, are curved to improve the light distribution, so that the light efficiency can be enhanced.

BEST MODE FOR CARRYING OUT THE INVENTION

Figure 1:
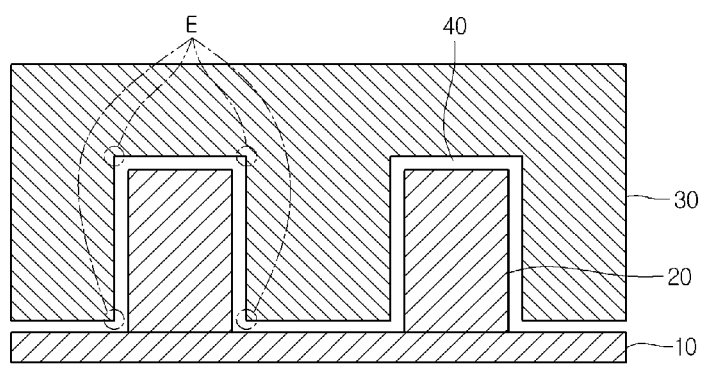
FIG. 1 is a sectional view showing a backlight unit employing an LED as a light source.

A backlight unit according to the embodiment includes a printed circuit board formed thereon with a plurality of LEDs; and a light guide member having receiving holes to receive the LEDs, wherein at least one round part having a predetermined curvature is formed at an edge defined in an intersection between an upper surface and an inner surface of the receiving hole.

Mode for the Invention

Hereinafter, the structure and operation of the embodiment will be described in detail with reference to accompanying drawings. The same reference numerals will be used to refer to the same elements throughout the drawings and detailed description thereof will be omitted in order to avoid redundancy. The terms 'first' and 'second' can be used to explain various elements, but the elements may not be limited to the above terms. These terms may be used to distinguish one element from other elements.

The subject matter of the embodiment is to provide a backlight unit including a light guide member, capable of improving the light efficiency by forming round parts at edges of the receiving holes to receive LEDs when forming the receiving holes at the light guide member.

Figure 2:
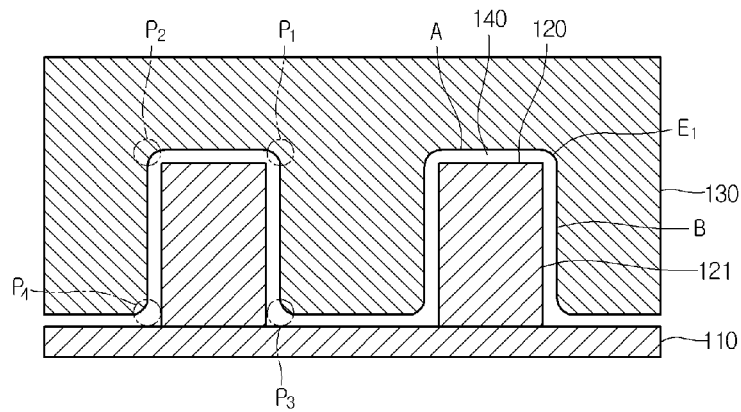
FIG. 2 is a sectional view showing a backlight unit according to the embodiment.
Figure 3:
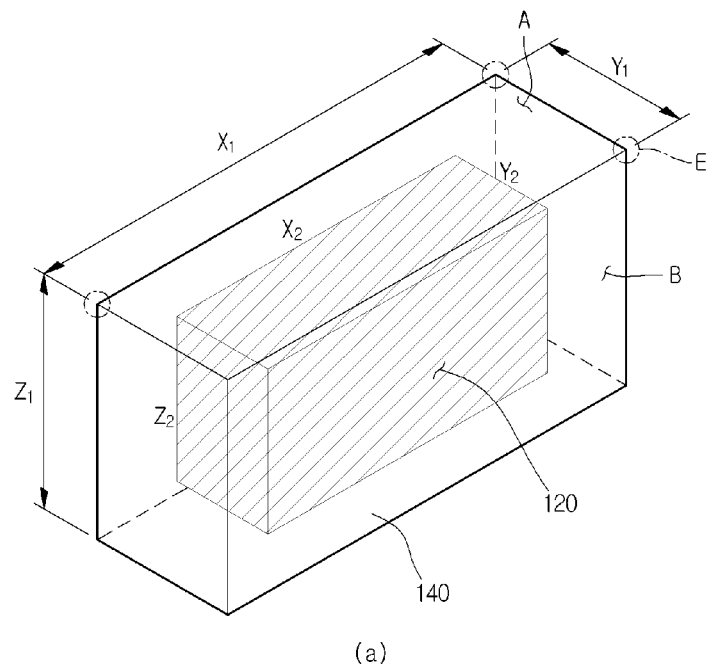
FIG. 3 is a perspective view showing a light guide member and an LED.
Figure 3:
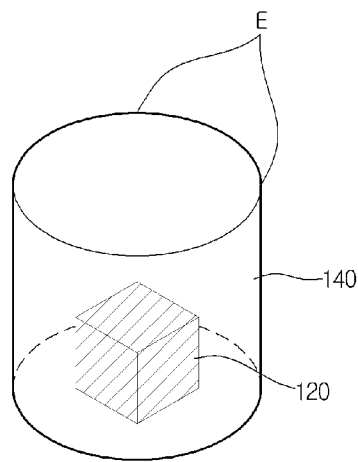
Figure 4:
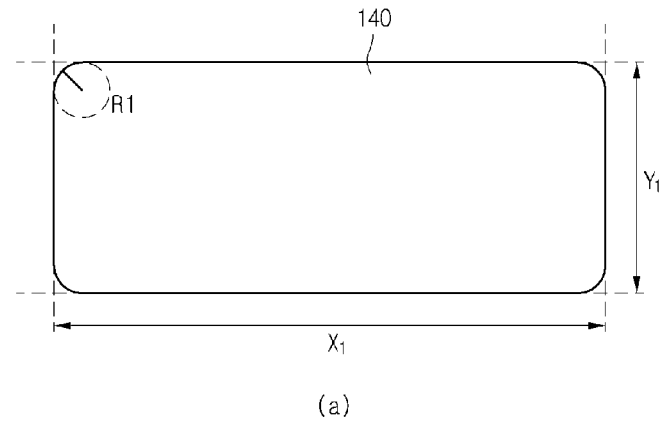
FIG. 4 is a view showing a receiving hole of a light guide member.
Figure 4:
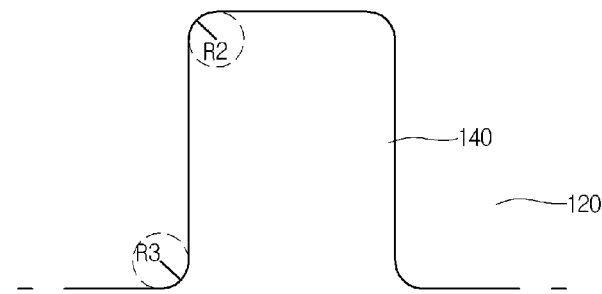

FIGS. 2 to 4 are schematic views for explaining the structure of the backlight unit according to the embodiment.

Referring to FIGS. 2 and 3, the backlight unit according to the embodiment includes a printed circuit board 110 formed thereon with a plurality of LEDs 120, and a light guide member 130 having receiving holes 140 to receive the LEDs 120. In particular, at least one round part having a predetermined curvature is formed at an edge E between an upper surface A and inner surfaces B of the receiving groove 140.

In detail, the LED 120 includes a side view LED having a light emitting surface directed toward the inner surfaces of the receiving hole 140. That is, the light emitted from the LED 120 is not directly travelled in the upward direction, but directed toward the sidewalls of the receiving hole 140.

In this case, the receiving hole 140 for receiving the LED 120 can be formed at a lower portion of the light guide member 130 in the form of a concave groove. In particular, the edges of the receiving hole 140 are rounded so that the round parts are formed.

FIG. 3 is a schematic view for explaining the receiving holes 140 and the edges according to the embodiment. The receiving holes 140 for receiving the LEDs 120 may have the rectangular parallelepiped shape or the regular hexahedral shape having an open bottom. The term 'edge' is defined as a corner formed at intersection between at least two surface of the receiving hole 140. That is, the edge includes an edge line formed between the upper surface A and one inner surface B of the receiving hole 140 and a vertex formed between the upper surface A and two inner surfaces B of the receiving hole 140.

Thus, if the receiving hole 140 has a cylindrical shape as shown in FIG. 3(b), a circumferential portion formed between a top surface and a sidewall of the cylindrical shape becomes the edge E and the round part is formed at the circumferential portion. Further, a gap between the inner wall of the receiving hole 140 and the LED 120 may have a size in the range of 0 mm to 100 mm. For instance, the distance between lateral sides X1, Y1 and Z1 of the receiving hole 140 and the lateral sides X2, Y2 and Z2 of the LED 120 may be set in the range of 0 mm to 100 mm.

$0 \leq X1-X2 \leq 100$ mm $0 \leq Y1-Y2 \leq 100$ mm $0 \leq Z1-Z2 \leq 100$ mm According to the exemplary embodiment, the round part is formed at the vertex.

Thus, when the receiving hole 140 has the rectangular parallelepiped shape, as shown in FIG. 2, at least one round part P1 and P2 (hereinafter, referred to as a first round part) can be formed at the edge E formed at an upper portion of the receiving hole 140. In addition, according to another embodiment, at least one round part P3 and P4 (hereinafter, referred to as a second round part) can be formed at the edge formed at a lower portion of the receiving hole 140. In this case, preferably, the first round part is curved reversely to the second round part.

FIG. 4 is a schematic view of the receiving hole 140 shown in FIGS. 2 and 3, in which (a) is a plan view and (b) is a side sectional view.

FIG. 4(a) shows the structure of the receiving hole 140 having the round part at the vertex (edge) of the upper surface of the receiving hole 140. The receiving hole 140 has the long lateral side X1 and the short lateral side Y1, and the edge has the round part having the curvature R1 equal to or less than ½ of the length of the short lateral side Y1 ($0 \leq R \leq \frac{1}{2} Y1$).

Although it has been illustrated in that the round parts are formed at four edges, it is also possible to form the round parts only at the edges directed in the light emitting direction.

FIG. 4(b) is a side sectional view of the receiving hole 140, in which the first round part R2 is formed at the upper portion of the receiving hole 140 and the second round part R3 is formed at the lower portion of the receiving hole 140. Due to the second round part R3, the non-uniform distribution of the light, which is caused because the light is reflected from the edge formed at the lower portion of the receiving hole 140, can be prevented. Meanwhile, since the second round part R3 is directed outward of the receiving hole 140, the space of the receiving hole 140 can be enlarged, so that the space for an air layer can be widened. Thus, the brightness can be improved and the light distribution can be improved due to the round parts.

Figure 5:
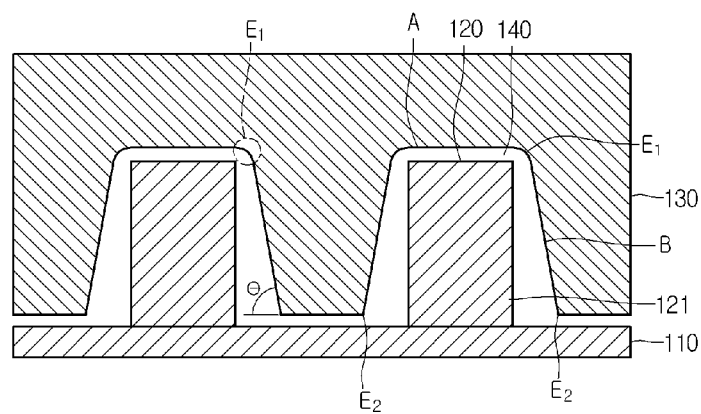
FIGS. 5 to 7 are views showing the structure of a backlight unit according to another embodiment.

FIG. 5 shows the structure of a backlight unit according to another embodiment. Referring to FIG. 5, the inner wall of the receiving hole 140 as shown in FIG. 2 is inclined by a predetermined angle.

In detail, the round part is formed an edge E1 formed at an upper surface of the receiving hole 140 and the inner wall of the receiving hole 140 is inclined by a predetermined angle, so that the inner space of the receiving hole 140 can be enlarged and the light distribution can be improved. That is, the inclination angle in the range of $0 \leq \theta \leq 90°$ can be formed between the inner surface of the receiving hole 140 or the extension line of the lower surface of the receiving hole 140 and the extension line of the lower surface of the light guide member 130.

Figure 6:
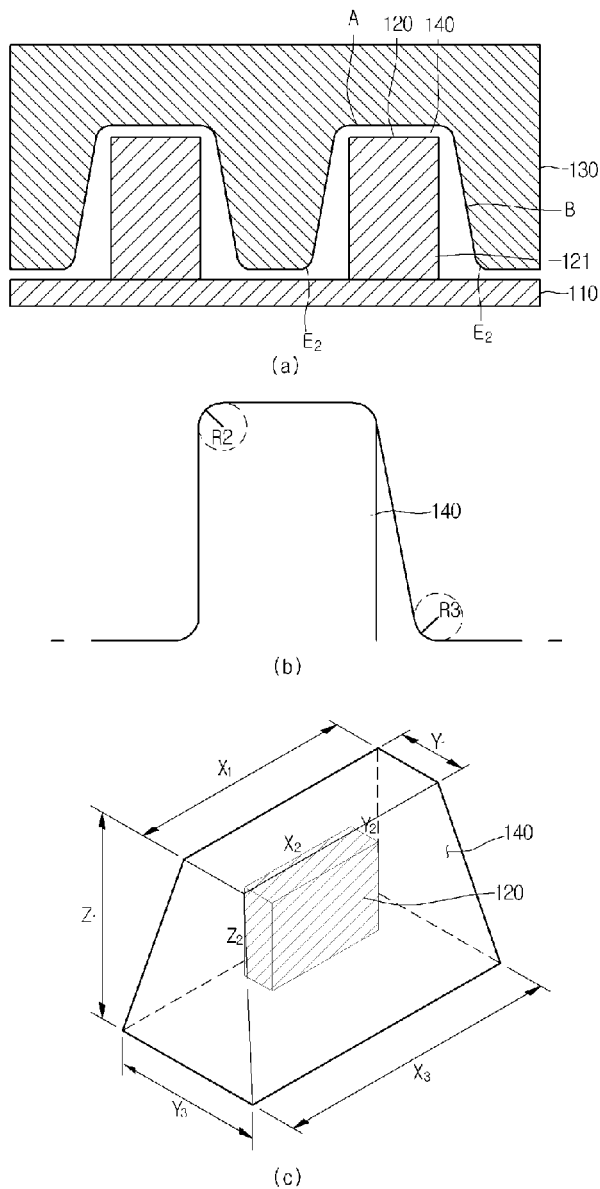

Further, as shown in FIG. 6a, the round part R3 (hereinafter, referred to as second round part) can be formed at the edge E2 formed at the lower portion of the receiving hole 140. Referring to FIG. 6b, preferably, the second round part R3 is curved reversely to the first round part R2. That is, the first and second round parts R2 and R3 have the structure identical to the structure shown in FIG. 2 except that the inner wall of the receiving hole 140 is inclined. As described above, due to the second round part R3, the non-uniform distribution of the light, which is caused because the light is reflected from the edge formed at the lower portion of the receiving hole 140, can be prevented. Meanwhile, since the second round part R3 is directed outward of the receiving hole 140, the space of the receiving hole 140 can be enlarged, so that the space for an air layer can be widened. Thus, the brightness can be improved and the light distribution can be improved due to the round parts.

FIG. 6c is a schematic view showing the structure of the receiving hole 140 before the round parts are formed at the receiving hole 140. The upper portion of the receiving hole 140 has a size different from that of the lower portion of the receiving hole 140 and a gap between the inner wall of the receiving hole 140 and the LED may have a size in the range of 0 mm to 100 mm. For instance, the distance between lateral sides X1, Y1 and Z1 of the receiving hole 140 and the lateral sides X2, Y2 and Z2 of the LED 120 may be set in the range of 0 mm to 100 mm. In addition, the lower portion of the receiving hole 140 is wider than the upper portion of the receiving hole 140. In particular, the long lateral side X3 and the short lateral side Y3 of the receiving hole 140, and the height Z1 of the receiving hole 140 are preferably set in a size equal to or less than 1000 mm.

$$X1 \leq X3 \leq 1000 \text{ mm}$$

$$Y1 \leq Y3 \leq 1000 \text{ mm}$$

$$Z2 \leq Z1 \leq 1000 \text{ mm}$$

Figure 7:
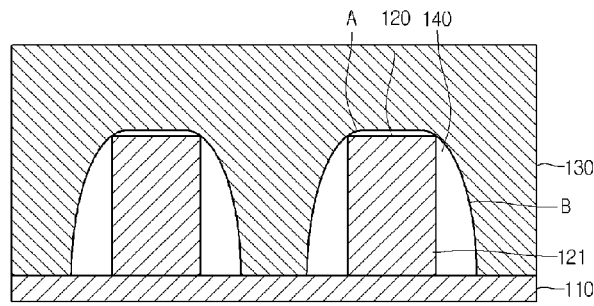
Figure 8:
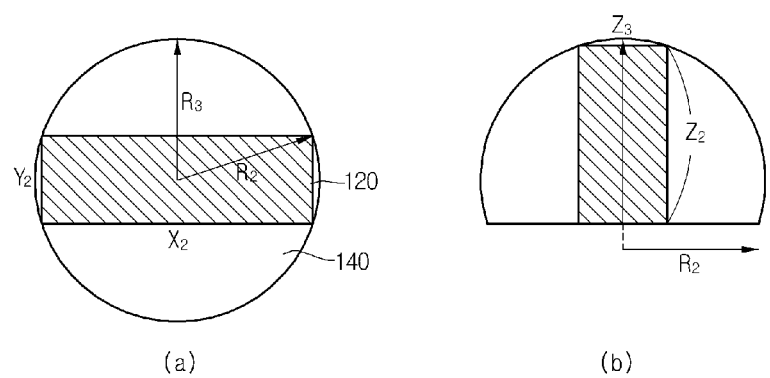
FIG. 8 is a view showing a receiving hole formed in a light guide member shown in FIG. 8.

FIGS. 7 and 8 are views showing a receiving hole according to another embodiment. FIG. 8b is a plan view showing the arrangement of the receiving hole 140 and the LED 120 illustrated in FIG. 8a.

As shown in FIGS. 7 and 8, the receiving hole 140 can be formed with the round part R3 having a size equal to or greater than ½ of the short lateral side Y2 of the upper surface of the receiving hole 140 or equal to or less than ½ of the diagonal line of the sectional shape of the LED. In detail, the receiving hole 140 may have a hemispherical shape by increasing the size of the round part.

In this case, the length of the diagonal line R2 from the center to the edge of the LED, the radius of curvature R3, the long lateral side X2 of the upper surface of the LED, and the short lateral side Y2 of the upper surface of the LED may satisfy the following equation.

$$R2=((X2^2+Y2^2)/2,(Y2)/2 \leq R3 \leq R2$$

If R2=R3, the receiving hole 140 has the hemispherical shape as shown in the drawing. However, if (Y2)/2≤R3≤R2, the receiving hole 140 has the oval shape.

In addition, referring to FIG. 8b, the depth Z3 of the receiving hole 140 according to the embodiment refers to the height of the receiving hole that receives the LED and the character Z2 refers to the height of the LED. According to the exemplary embodiment, the depth Z3 of the receiving hole 140 is preferably larger than the height Z2 of the LED (0<Z2<Z3).

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A light unit comprising:
a printed circuit board with a plurality of light sources thereon; and
a light guide member having receiving holes to receive the light sources;
wherein the light guide member comprises at least one first round part having a predetermined curvature formed at a vertex that is defined at an intersection between an upper surface and an inner surface of each of the receiving holes, and at least one second round part formed at a vertex that is defined at an intersection between a lower surface having an open structure and the inner surface of each of the receiving holes,
wherein each of the light sources is disposed within a corresponding receiving hole of the plurality of receiving holes, and
wherein each of the light sources comprises an upper surface corresponding to the upper surface of each respective receiving hole and a side surface corresponding to the inner surface of each respective receiving hole.

2. The light unit of claim 1, wherein the upper surface of each receiving hole has a width equal to or smaller than a width of the lower surface of the corresponding receiving hole.

3. The light unit of claim 1, wherein the at least one first round part has a radius of curvature equal to or less than a ½ length of a short lateral side of the upper surface of each of the receiving holes.

4. The light unit of claim 3, wherein the at least one first round part has a radius of curvature equal to or less than a ½ length of a diagonal line of a sectional shape of the light source.

5. The light unit of claim 1, wherein the upper surface of each of the receiving holes has the width different from the width of the lower surface of each of the receiving holes.

6. The light unit of claim 1, wherein the inner surface of each of the receiving holes forms an angle of 90° or less with respect to an extension line of a lower surface of the light guide member.

7. The light unit of claim 1, wherein a gap between each of the receiving holes and the light source has a size equal to or less than 100 mm.

8. A light unit comprising:
a printed circuit board with a plurality of light sources thereon; and
a light guide member having receiving holes to receive the light sources;
wherein each of the receiving holes includes an upper surface, a lower surface having an open structure, and an inner surface, which are defined in the light guide member, the upper surface of each of the receiving holes has a width different from a width of the lower surface of each of the receiving holes, and at least one first round part having a predetermined curvature is formed at a vertex defined at an intersection between the inner surface and the upper surface of each of the receiving holes, and at least one second round pail is formed at a vertex defined at an intersection between the inner surface and the lower surface of each of the receiving holes.

9. The light unit of claim 8, wherein the width of the lower surface of each of the receiving holes is larger than the width of the upper surface of each of the receiving holes.

10. The light unit of claim 9, wherein the inner surface of each of the receiving holes forms an angle of 90° or less with respect to an extension line of a lower surface of the light guide member.

* * * * *